United States Patent
Lightner et al.

(10) Patent No.: US 9,922,032 B2
(45) Date of Patent: Mar. 20, 2018

(54) FEATURED CO-OCCURRENCE KNOWLEDGE BASE FROM A CORPUS OF DOCUMENTS

(71) Applicant: QBASE, LLC, Reston, VA (US)

(72) Inventors: Scott Lightner, Leesburg, VA (US); Rakesh Dave, Dayton, OH (US); Sanjay Boddhu, Dayton, OH (US)

(73) Assignee: QBase, LLC, Reston, VA (US)

( * ) Notice: Subject to any disclaimer, the term of this patent is extended or adjusted under 35 U.S.C. 154(b) by 0 days.

(21) Appl. No.: 14/558,224

(22) Filed: Dec. 2, 2014

(65) Prior Publication Data

US 2015/0154509 A1    Jun. 4, 2015

Related U.S. Application Data

(60) Provisional application No. 61/910,887, filed on Dec. 2, 2013.

(51) Int. Cl.
| | |
|---|---|
| G06F 7/00 | (2006.01) |
| G06F 17/30 | (2006.01) |
| G06N 5/02 | (2006.01) |
| G06F 17/00 | (2006.01) |

(52) U.S. Cl.
CPC .... *G06F 17/30011* (2013.01); *G06F 17/3002* (2013.01); *G06F 17/30312* (2013.01); *G06F 17/30731* (2013.01); *G06F 17/30946* (2013.01); *G06N 5/022* (2013.01)

(58) Field of Classification Search
CPC .......... G06F 17/3002; G06F 17/30312; G06F 17/30946; G06F 17/30011; G06F 17/30731

USPC .......................................................... 707/741
See application file for complete search history.

(56) References Cited

U.S. PATENT DOCUMENTS

| | | | |
|---|---|---|---|
| 6,128,660 A | 10/2000 | Grimm et al. | |
| 6,178,529 B1 | 1/2001 | Short et al. | |
| 6,266,781 B1 | 7/2001 | Chung et al. | |
| 6,353,926 B1 | 3/2002 | Parthesarathy et al. | |
| 6,738,759 B1 | 5/2004 | Wheeler et al. | |
| 6,832,737 B2 | 12/2004 | Karlsson et al. | |
| 7,058,846 B1 | 6/2006 | Kelkar et al. | |
| 7,370,323 B2 | 5/2008 | Mannelli et al. | |
| 7,421,478 B1 | 9/2008 | Muchow | |

(Continued)

FOREIGN PATENT DOCUMENTS

WO       2013/003770       1/2013

OTHER PUBLICATIONS

International Search Report dated Apr. 15, 2015 corresponding to International Patent Application No. PCT/US2014/067994, 4 pages.

(Continued)

*Primary Examiner* — Kannan Shanmugasundaram
(74) *Attorney, Agent, or Firm* — Eric L. Sophir; Dentons US LLP

(57) ABSTRACT

A system for building a knowledge base of co-occurring features extracted from a document corpus is disclosed. The method includes a plurality of feature extraction software modules that may extract different features from each document in the corpus. The system may include a knowledge base aggregator module that may keep count of the co-occurrences of features in the different documents of a corpus and determine appropriate co-occurrences to store in a knowledge base.

18 Claims, 2 Drawing Sheets

(56) References Cited

U.S. PATENT DOCUMENTS

| | | |
|---|---|---|
| 7,447,940 B2 | 11/2008 | Peddada |
| 7,543,174 B1 | 6/2009 | Van Rietschote et al. |
| 7,681,075 B2 | 3/2010 | Havemose et al. |
| 7,818,615 B2 | 10/2010 | Krajewski et al. |
| 7,899,871 B1 | 3/2011 | Kumar et al. |
| 8,055,933 B2 | 11/2011 | Jaehde et al. |
| 8,122,026 B1 | 2/2012 | Laroco et al. |
| 8,341,622 B1 | 12/2012 | Eatough |
| 8,345,998 B2 | 1/2013 | Malik et al. |
| 8,356,036 B2 | 1/2013 | Bechtel et al. |
| 8,375,073 B1 | 2/2013 | Jain |
| 8,423,522 B2 | 4/2013 | Lang et al. |
| 8,429,256 B2 | 4/2013 | Vidal et al. |
| 8,726,267 B2 | 5/2014 | Li et al. |
| 8,782,018 B2 | 7/2014 | Shim et al. |
| 8,995,717 B2 | 3/2015 | Cheng et al. |
| 9,009,153 B2 | 4/2015 | Khan et al. |
| 9,025,892 B1 | 5/2015 | Lightner et al. |
| 9,032,387 B1 | 5/2015 | Hill et al. |
| 2001/0037398 A1 | 11/2001 | Chao et al. |
| 2002/0031260 A1 | 3/2002 | Thawonmas et al. |
| 2002/0083049 A1* | 6/2002 | Forster ............ G06F 17/30286 |
| 2002/0165847 A1 | 11/2002 | McCartney et al. |
| 2002/0174138 A1 | 11/2002 | Nakamura |
| 2003/0028869 A1 | 2/2003 | Drake et al. |
| 2003/0112792 A1 | 6/2003 | Cranor et al. |
| 2003/0158839 A1 | 8/2003 | Faybishenko et al. |
| 2003/0182282 A1 | 9/2003 | Ripley |
| 2004/0027349 A1 | 2/2004 | Landau et al. |
| 2004/0049478 A1 | 3/2004 | Jasper |
| 2004/0143571 A1 | 7/2004 | Bjornson et al. |
| 2004/0153869 A1 | 8/2004 | Marinelli et al. |
| 2004/0205064 A1 | 10/2004 | Zhou et al. |
| 2004/0215755 A1 | 10/2004 | O'Neill |
| 2004/0243645 A1 | 12/2004 | Broder et al. |
| 2005/0192994 A1 | 9/2005 | Caldwell et al. |
| 2006/0101081 A1 | 5/2006 | Lin et al. |
| 2006/0294071 A1 | 12/2006 | Weare et al. |
| 2007/0005639 A1 | 1/2007 | Gaussier et al. |
| 2007/0013967 A1* | 1/2007 | Ebaugh ............ G06F 17/30613 358/448 |
| 2007/0156748 A1 | 7/2007 | Emam et al. |
| 2007/0203693 A1 | 8/2007 | Estes |
| 2007/0203924 A1 | 8/2007 | Guha et al. |
| 2007/0240152 A1 | 10/2007 | Li et al. |
| 2007/0250501 A1* | 10/2007 | Grubb et al. .................. 707/5 |
| 2007/0250519 A1 | 10/2007 | Fineberg et al. |
| 2007/0282959 A1 | 12/2007 | Stern |
| 2008/0010683 A1 | 1/2008 | Baddour et al. |
| 2008/0027920 A1 | 1/2008 | Schipunov et al. |
| 2008/0077570 A1 | 3/2008 | Tang et al. |
| 2009/0019013 A1 | 1/2009 | Tareen et al. |
| 2009/0043792 A1 | 2/2009 | Barsness et al. |
| 2009/0049038 A1 | 2/2009 | Gross |
| 2009/0089626 A1 | 4/2009 | Gotch et al. |
| 2009/0094484 A1 | 4/2009 | Son et al. |
| 2009/0222395 A1 | 9/2009 | Light et al. |
| 2009/0240682 A1 | 9/2009 | Balmin et al. |
| 2009/0292660 A1 | 11/2009 | Behal et al. |
| 2009/0299999 A1 | 12/2009 | Loui et al. |
| 2009/0322756 A1 | 12/2009 | Robertson et al. |
| 2010/0077001 A1 | 3/2010 | Vogel et al. |
| 2010/0138931 A1 | 6/2010 | Thorley et al. |
| 2010/0223264 A1 | 9/2010 | Brucker et al. |
| 2010/0235311 A1 | 9/2010 | Cao et al. |
| 2010/0274785 A1 | 10/2010 | Procopiuc et al. |
| 2011/0071975 A1 | 3/2011 | Friedlander et al. |
| 2011/0093471 A1 | 4/2011 | Brockway et al. |
| 2011/0119243 A1 | 5/2011 | Diamond et al. |
| 2011/0125764 A1 | 5/2011 | Carmel et al. |
| 2011/0161333 A1 | 6/2011 | Langseth et al. |
| 2011/0282888 A1 | 11/2011 | Koperski |
| 2011/0296397 A1 | 12/2011 | Vidal et al. |
| 2012/0030220 A1 | 2/2012 | Edwards et al. |
| 2012/0059839 A1 | 3/2012 | Andrade et al. |
| 2012/0102121 A1 | 4/2012 | Wu et al. |
| 2012/0117069 A1 | 5/2012 | Kawanishi et al. |
| 2012/0131139 A1 | 5/2012 | Siripurapu et al. |
| 2012/0246154 A1 | 9/2012 | Duan et al. |
| 2012/0310934 A1 | 12/2012 | Peh et al. |
| 2012/0323839 A1 | 12/2012 | Kiciman et al. |
| 2012/0323923 A1* | 12/2012 | Duan ................ G06F 17/30486 707/741 |
| 2013/0132405 A1 | 5/2013 | Bestgen et al. |
| 2013/0166480 A1 | 6/2013 | Popescu et al. |
| 2013/0166547 A1 | 6/2013 | Pasumarthi et al. |
| 2013/0290232 A1 | 10/2013 | Tsytsarau et al. |
| 2013/0303198 A1 | 11/2013 | Sadasivam et al. |
| 2014/0013233 A1 | 1/2014 | Ahlberg et al. |
| 2014/0022100 A1 | 1/2014 | Fallon et al. |
| 2014/0046921 A1* | 2/2014 | Bau .............................. 707/706 |
| 2014/0156634 A1 | 6/2014 | Buchmann et al. |
| 2014/0244550 A1 | 8/2014 | Jin et al. |
| 2014/0280183 A1 | 9/2014 | Brown et al. |
| 2014/0351233 A1 | 11/2014 | Crupi et al. |
| 2015/0074037 A1 | 3/2015 | Sarferaz |
| 2015/0154079 A1 | 6/2015 | Lightner et al. |
| 2015/0154264 A1 | 6/2015 | Lightner et al. |
| 2015/0154297 A1 | 6/2015 | Lightner et al. |

OTHER PUBLICATIONS

Written Opinion of the International Searching Authority dated Apr. 15, 2015 corresponding to International Patent Application No. PCT/US2014/067994, 9 pages.

International Search Report and Written Opinion dated Mar. 3, 2015, corresponding to International Patent Application No. PCT/US2014/067921, 10 pages.

International Search Report and Written Opinion dated Mar. 6, 2015 corresponding to International Patent Application No. PCT/US2014/067993, 9 pages.

International Search Report and Written Opinion dated Mar. 10, 2015 corresponding to International Patent Application No. PCT/US2014/067999, 10 pages.

International Search Report and Written Opinion dated Feb. 24, 2015 corresponding to International Patent Application No. PCT/US2014/067918, 10 pages.

Tunkelang, D. "Faceted Search," Morgan & Claypool Publ., 2009, pp. i-79.

Schuth, A., et al., "University of Amsterdam Data Centric Ad Hoc Faceted Search Runs," ISLA, 2012, pp. 155-160.

Tools, Search Query Suggestions using ElasticSearch via Shingle Filter and Facets, Nov. 2012, pp. 1-12.

Wang, et al., "Automatic Online News Issue Construction in Web Environment," WWW 2008/Refereed Track: Search—Applications, Apr. 21-25, 2008—Beijing, China, pp. 457-466.

Blei et al., "Latent Dirichlet Allocation" Journal of Machine Learning Research 3 (2003), pp. 993-1022.

Chuang et al., "A Practical Web-based Approach to Generating Topic Hierarchy for Text Segments," CIKM '04, Nov. 8-13, 2004, Washington, DC, USA, Copyright 2004 ACM 1-58113-874-0/04/0011, pp. 127-136.

International Search Report and Written Opinion of the International Searching Authority dated Apr. 15, 2015, corresponding to International Patent Application No. PCT/2014/067994, 9 pages.

Vizard, The Rise of In-Memory Databases, Jul. 13, 2012.

* cited by examiner

FEATURED CO-OCCURRENCE KNOWLEDGE BASE FROM A CORPUS OF DOCUMENTS

CROSS-REFERENCE TO RELATED APPLICATIONS

This application claims the benefit of U.S. Provisional Application No. 61/910,763, entitled "Featured Co-Occurrence Knowledge Base From A Corpus of Documents," filed on Dec. 2, 2013, which is incorporated herein by reference in its entirety.

This application is related to U.S. patent application Ser. No. 14/557,794, entitled "Method for Disambiguating Features in Unstructured Text, filed Dec. 2, 2014, now U.S. Pat. No. 9,239,875, issued Jan. 19, 2016; and U.S. patent application Ser. No. 14/558,300, entitled "Event Detection Through Text Analysis Using Trained Event Template Models," filed Dec. 2, 2014, now U.S. Pat. No. 9,177,254, issued Nov. 3, 2015; each of which are incorporated herein by reference in their entirety.

FIELD OF THE DISCLOSURE

The present disclosure relates in general to information data, and more specifically to a method for building a knowledge base storage of feature co-occurrences.

BACKGROUND

Searching information about entities (i.e., people, locations, organizations) in a large amount of documents, including sources such as the World Wide Web, may often be ambiguous, which may lead to imprecise text processing functions and thus imprecise data analysis. For example, a reference to "Paris," could refer to a city in the country of France, cities in the States of Texas, Tennessee or Illinois, or even a person (e.g., "Paris Hilton"). Associating entities with co-occurring features may prove helpful in disambiguating different entities.

Large companies or organizations may contain vast amounts of information stored in large electronic document repositories. Generally, information stored in document format may be written in an unstructured manner. Searching or identifying specific information in these document repositories may be tedious and/or troublesome. Identifying co-occurrence of different features together with entities, topics, events, keywords and the like in a document corpus may help to better identify specific information in the same. The need for intelligent electronic assistants to aid in locating and/or discovering useful or desired information amongst the vast amounts of data may be significant.

Thus a need exists for an intelligent electronic system for detecting and recording co-occurring features in a corpus of documents.

SUMMARY

A system and method for building a knowledge base of feature co-occurrences from a document corpus. The system may include a plurality of software and hardware computer modules to extract different features such as entities, topics, events, facts and/or any other features that may be derived from a document. The system may crawl each document in a document corpus and extract features from each individual document. After different features are extracted from a document they may be submitted to a knowledge base aggregator where the co-occurrences of two or more features may be aggregated with co-occurrences of the same features in different documents. Once the aggregation for the co-occurring features reach a determined threshold the co-occurrences and additional metadata related to the co-occurring features may be stored in the knowledge base. The knowledge base of co-occurring features may serve to assist in subsequent disambiguation of features. The knowledge base may be created using a single document corpus or a plurality of document corpora.

In one embodiment, a method is provided that includes crawling, via an entity extraction computer, the corpus of electronic documents, extracting, via the entity extraction computer, a plurality of features from each of the crawled documents in the corpus and aggregating, via a knowledge base aggregator computer, instances of co-occurrence of two or more of the plurality of features across the crawled documents to determine a count of the instances of co-occurrence. The method further includes adding, via the knowledge base aggregator computer, an instance of co-occurrence of the two or more features to the feature co-occurrence database when the count of the instances of co-occurrence exceeds a predetermined threshold.

In another embodiment, a system is provided. The system includes an entity extraction computer configured to crawl a corpus of electronic documents and extract a plurality of features from each of the crawled documents in the corpus. The system further includes a knowledge base aggregator computer configured to aggregate instances of co-occurrence of two or more of the plurality of features across the crawled documents to determine a count of the instances of co-occurrence, and add an instance of co-occurrence of the two or more features to a feature co-occurrence database when the count of the instances of co-occurrence exceeds a predetermined threshold.

In yet another embodiment, a non-transitory computer readable medium having stored thereon computer executable instructions comprises crawling, via an entity extraction computer, a corpus of electronic documents; extracting, via the entity extraction computer, a plurality of features from each of the crawled documents in the corpus; aggregating, via a base aggregator computer, instances of co-occurrence of two or more of the plurality of features across the crawled documents to determine a count of the instances of co-occurrence; and adding, via the base aggregator computer, an instance of co-occurrence of the two or more features to a feature co-occurrence database when the count of the instances of co-occurrence exceeds a predetermined threshold.

Numerous other aspects, features and benefits of the present disclosure may be made apparent from the following detailed description taken together with the drawing figures.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DEFINITIONS

Figure 1:
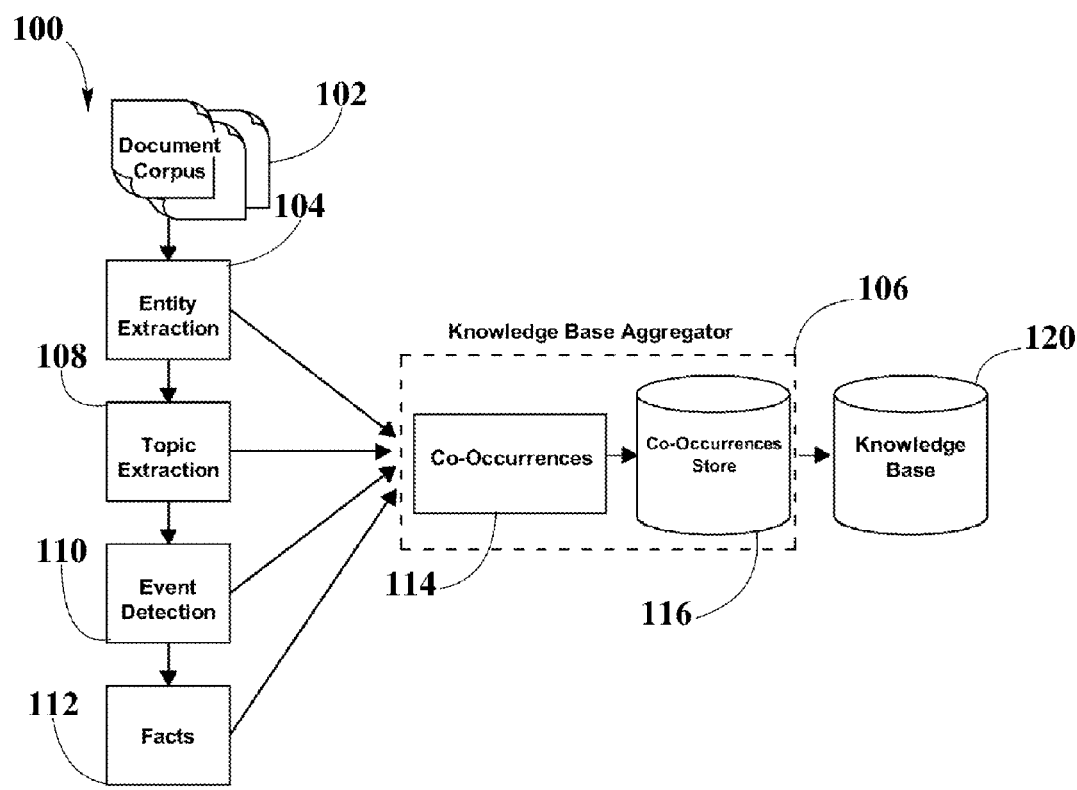
FIG. 1 is a diagram of a central computer server system for building a knowledge base of co-occurrences, according to an embodiment.

As used herein, the following terms have the following definitions:

"Entity extraction" refers to information processing methods for extracting information such as names, places, and organizations.

"Corpus" refers to a collection of one or more documents

"Features" is any information which is at least partially derived from a document.

"Feature attribute" refers to metadata associated with a feature; for example, location of a feature in a document, confidence score, among others.

"Topic" refers to a set of thematic information which is at least partially derived from a corpus.

"Event" refers to one or more features characterized by at least its occurrence in time.

"Event concept store" refers to a database of event template models.

"Module" refers to computer hardware and/or software components suitable for carrying out at least one or more tasks.

"Knowledge base" refers to a database of known feature associations.

DETAILED DESCRIPTION

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to one skilled in the relevant art and having possession of this disclosure, are to be considered within the scope of the invention.

The embodiments describe a system and method for detecting, extracting and validating co-occurring features from a document corpus and storing them in a knowledge base repository.

The feature co-occurrence knowledge base uses natural language process tools (e.g., key phrase extraction, named entity recognition, topic modeling, fact extraction, event extraction) to build a comprehensive store of complex structured information in the form of feature co-occurrence from unstructured data. Further, feature co-occurrence can allow for derivation of new knowledge and utilize it in an application (e.g., disambiguation) in order to improve precision over other existing methods.

FIG. 1 is a central server computer system 100 for building a knowledge base 120 of co-occurring features from a document corpus 102 and including a plurality of special-purpose computer modules having one or more processors executing programmatic logic described below. Additional embodiments of the system may be implemented in various operating environments that include personal computers, server computers, handheld or laptop devices, multiprocessor systems, microprocessor-based systems, programmable consumer electronics, network PCs, minicomputers, mainframe computers, distributed computing environments and so on.

Document corpus 102 may be any collection of documents such as, for example, a database of digital documents from a company or the World Wide Web.

The process may involve crawling through each document in document corpus 102. A document may include information in unstructured text format which may be crawled using natural language processing techniques (NLP). Some NLP techniques include, for example, removing stop words, tokenization, stemming and part-of speech tagging among others know in the art.

An individual file may first go through an entity extraction module 104 where entities (e.g., a person, location, or organization name) are identified and extracted. Entity extraction module 104 may be a software module with programmatic logic that may extract entities by crawling through the document. The extracted entities may then be passed to a knowledge base aggregator 106.

The file may then go through a topic extractor module 108, which may be executed by an in-memory database computer. The in-memory database computer can be a database storing data in records controlled by a database management system (DBMS) (not shown) configured to store data records in a device's main memory, as opposed to conventional databases and DBMS modules that store data in "disk" memory. Conventional disk storage requires processors (CPUs) to execute read and write commands to a device's hard disk, thus requiring CPUs to execute instructions to locate (i.e., seek) and retrieve the memory location for the data, before performing some type of operation with the data at that memory location. In-memory database systems access data that is placed into main memory, and then addressed accordingly, thereby mitigating the number of instructions performed by the CPUs and eliminating the seek time associated with CPUs seeking data on hard disk.

In-memory databases may be implemented in a distributed computing architecture, which may be a computing system comprising one or more nodes configured to aggregate the nodes' respective resources (e.g., memory, disks, processors). As disclosed herein, embodiments of a computing system hosting an in-memory database may distribute and store data records of the database among one or more nodes. In some embodiments, these nodes are formed into "clusters" of nodes. In some embodiments, these clusters of nodes store portions, or "collections," of database information.

Various embodiments provide a computer executed feature disambiguation technique that employs an evolving and efficiently linkable feature knowledge base that is configured to store secondary features, such as co-occurring topics, key phrases, proximity terms, events, facts and trending popularity index. The disclosed embodiments may be performed via a wide variety of linking algorithms that can vary from simple conceptual distance measure to sophisticated graph clustering approaches based on the dimensions of the involved secondary features that aid in resolving a given extracted feature to a stored feature in the knowledge base. Additionally, embodiments can introduce an approach to evolves the existing feature knowledge base by a capability that not only updates the secondary features of the existing feature entry, but also expands it by discovering new features that can be appended to the knowledge base.

Topic extractor module 108 may extract the theme or topic of a single document file. In most cases a file may include a single topic, however a plurality of topics may also exist in a single document. Topic extraction techniques may include, for example, comparing keywords against latent Dirichlet allocation (LDA) models or any other techniques for topic identification. The extracted topic may also be passed to knowledge base aggregator 106 for further processing.

System 100 may also include an event detection module 110 for extracting events from a document file. Different types of events may include an accident (e.g., car accident, a train accident, etc.), a natural disaster (e.g., an earthquake, a flood, a weather event, etc.), a man-made disaster (e.g., a bridge collapse, a discharge of a hazardous material, an explosion, etc.), a security event (e.g., a terrorist attack, an act of war, etc.), and/or any other event that may trigger a response from authorities and/or first responders and/or may trigger a notification to a large quantity (e.g., greater than some threshold) of user devices (e.g., acts associated with a major sporting event or concert, election day coordination, traffic management due to road construction, etc.). Event detection module 110 may be a software module with programmatic logic that may detect events by extracting keywords from a file and comparing them against event template models stored in an event concept store database. The extracted events may also be passed to knowledge base aggregator 106 for further processing.

A fact extractor module 112 may also be implemented. Fact extractor module 112 may be a software module with programmatic logic that may extract facts by crawling through the document. Fact extractor module 112 may extract facts by comparing factual text descriptions in a document and comparing them against a fact-word table. Other methods for identifying facts in documents may also be implemented. Identified facts may be passed to knowledge base aggregator 106 for further processing.

All extracted features from a single document may then be processed by the knowledge base aggregator 106. Knowledge base aggregator 106 may include a co-occurrence module 114 and a co-occurrence store aggregator 116. Co-occurrence module 114 may be a software module with programmatic logic that may aggregate co-occurrence of features across a plurality of documents and record the count of co-occurrences in co-occurrence store aggregation 116. Whenever the co-occurrence of features across documents in a document corpus 102 exceed a determined threshold the co-occurrence of entities may be added to knowledge base 120 along with any metadata pertaining to the co-occurring features. Metadata that may be added to knowledge base 120 may include, for example, the type of the features, the document from where the co-occurrence was extracted, the document corpus, distance in text between co-occurring features, a confidence score that may serve has an indication that the co-occurrence of the features may resemble unique individual features. A confidence score may be calculated by using parameters such as, for example, number of co-occurrences in a single file, number of co-occurrences in a document corpus, size of document corpus, number of co-occurrences in different document corpora, distance in text from co-occurring features, human verification and or any combination thereof.

It may be understood that FIG. 1 illustrates an exemplary embodiment and is in no way limiting the scope of the invention. Additional modules for extracting different features not illustrated in FIG. 1 may also been included and are to be considered within the scope of the invention. All software modules may be implemented in a single computer or in a distributed computer architecture across a plurality of computers, whereby the one or more modules may be embodied on at least one computer readable medium and executed by at least one processor.

Figure 2:
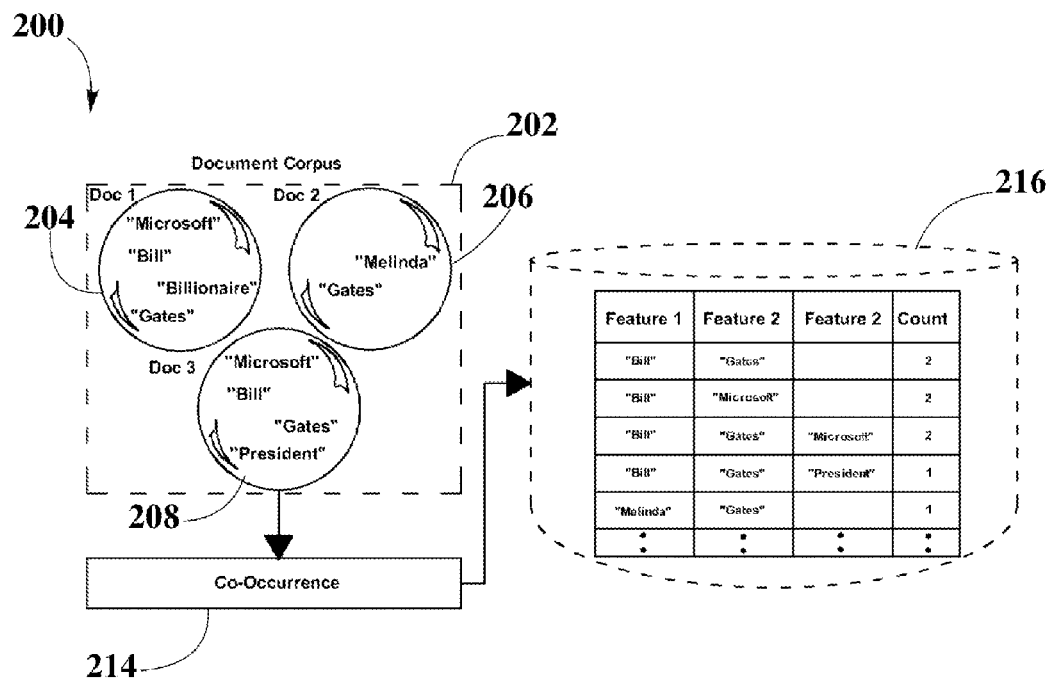
FIG. 2 is a diagram of a co-occurring aggregation method, according to an embodiment.

FIG. 2 is an example embodiment of a co-occurring aggregation method 200 using the system described in FIG. 1. In the illustrated embodiment document corpus 202 may include three different document files. Features extracted from first document 204 may include "Bill", "Gates", "Microsoft", "Billionaire". Features extracted from second document 206 may include "Bill", "Gates", "President", "Microsoft". Features extracted from third document 208 may include "Melinda" and "Gates". Co-occurrence module 214 may then crawl each document in document corpus 202, store all possible co-occurring feature combinations for a single document and aggregate them with same feature co-occurrences from the other documents of the same corpus. The aggregation process may be done and stored in co-occurrence store aggregator 216. For example in FIG. 2 the entities "Bill" and "Gates" co-occur twice, once in first document 204 and once in third document 208 while the entities "Melinda" and "Gates" co-occur once in second document 206.

In one embodiment, a method comprises crawling, via an entity extraction computer, a corpus of electronic documents; extracting, via the entity extraction computer, a plurality of features from each of the crawled documents in the corpus; aggregating, via a knowledge base aggregator computer, instances of co-occurrence of two or more of the plurality of features across the crawled documents to determine a count of the instances of co-occurrence; and adding, via the knowledge base aggregator computer, an instance of co-occurrence of the two or more features to a feature co-occurrence database when the count of the instances of co-occurrence exceeds a predetermined threshold.

In another embodiment, a system comprises an entity extraction computer configured to crawl a corpus of electronic documents and extract a plurality of features from each of the crawled documents in the corpus; and a knowledge base aggregator computer configured to aggregate instances of co-occurrence of two or more of the plurality of features across the crawled documents to determine a count of the instances of co-occurrence, and add an instance of co-occurrence of the two or more features to a feature co-occurrence database when the count of the instances of co-occurrence exceeds a predetermined threshold.

In yet another embodiment, a non-transitory computer readable medium having stored thereon computer executable instructions comprises crawling, via an entity extraction computer, a corpus of electronic documents; extracting, via the entity extraction computer, a plurality of features from each of the crawled documents in the corpus; aggregating, via a base aggregator computer, instances of co-occurrence of two or more of the plurality of features across the crawled documents to determine a count of the instances of co-occurrence; and adding, via the base aggregator computer, an instance of co-occurrence of the two or more features to a feature co-occurrence database when the count of the instances of co-occurrence exceeds a predetermined threshold.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method comprising:
   crawling, via an entity extraction computer, a corpus of a plurality of electronic documents;
   extracting, via the entity extraction computer, a plurality of features from each of the crawled electronic documents in the corpus;
   aggregating, via a knowledge base aggregator computer, instances of co-occurrence of two or more of the plurality of features across the crawled electronic documents to determine a count of the instances of co-occurrence across the plurality of electronic documents,
      wherein the count of the instances of co-occurrence of two or more features are determined by adding up number of co-occurrences of the two or more features co-occurred in each of the plurality of electronic documents,
      wherein the knowledge base aggregator computer includes a main memory hosting a feature co-occurrence in-memory database, wherein the entity extraction computer is distinct from the knowledge base aggregator computer, wherein the feature co-occurrence in-memory database comprises one or more entries of the plurality of features, wherein each entry of the one or more entries contains semantically-related features of the plurality of features, and wherein the co-occurrence is an instance of a feature of the plurality of features identified by an entry of the one or more entries in the corpus of the electronic documents in the co-occurrence database, and wherein the co-occurrence corresponds to determination of related entities upon the occurrence of the two or more of the plurality of features that are related to each other across the crawled electronic documents in no defined order; and
   adding, via the knowledge base aggregator computer, the instances of the co-occurrence of the two or more features to the feature co-occurrence database based on the count of the instances of co-occurrence across the plurality of electronic documents exceeding a predetermined threshold.

2. The method of claim 1 wherein each of the plurality of features is selected from the group consisting of a person, a location, an organization name, a topic, an event, and a fact.

3. The method of claim 1 further comprising adding, via the knowledge base aggregator computer, the instances of the co-occurrence of the two or more features to the feature co-occurrence database along with metadata pertaining to the instance.

4. The method of claim 3 wherein the metadata is selected from the group consisting of feature type, document identifier, document corpus identifier, distance in text between co-occurring features, and a confidence score.

5. The method of claim 3 where in the metadata includes a confidence score indicative whether the two or more of the plurality of features associated with a respective instance of co-occurrence are unique.

6. The method of claim 5 wherein the confidence score is calculated using a plurality of parameters including a number of co-occurrences in a single electronic document, a number of co-occurrences in the corpus of electronic documents, a size of the corpus of electronic documents, a number of co-occurrences in different corpora of electronic documents, distance in text from co-occurring features, and an indicator of human verification.

7. A system comprising:
an entity extraction computer configured to crawl a corpus of a plurality of electronic documents and extract a plurality of features from each of the crawled electronic documents in the corpus;
a feature co-occurrence in-memory database comprises one or more entries of the plurality of features, wherein each entry of the one or more entries contains semantically related features of the plurality of features; and
a knowledge base aggregator computer including a main memory hosting the feature co-occurrence in-memory database, wherein the entity extraction computer is distinct from the knowledge base aggregator computer, wherein the knowledge base aggregator computer is configured to aggregate instances of co-occurrence two or more of the plurality of features across the crawled electronic documents to determine a count of the instances of co-occurrence across the plurality of electronic documents, wherein the count of the instances of co-occurrence of two or more features are determined by adding up number of co-occurrences of the two or more features co-occurred in each of the plurality of electronic documents, wherein the co-occurrence is an instance of a feature of the plurality of features identified by an entry of the one or more entries in the corpus of the electronic documents in the co-occurrence database, and wherein the co-occurrence corresponds to determination of related entities upon the occurrence of the two or more of the plurality of features that are related to each other across the crawled electronic documents in no defined order, and add the instances of the co-occurrence of the two or more features to a feature co-occurrence database based on the count of the instances of co-occurrence across the plurality of electronic documents exceeding a predetermined threshold.

8. The system of claim 7 wherein each of the plurality of features is selected from the group consisting of a person, a location, an organization name, a topic, an event, and a fact.

9. The system of claim 7 wherein the knowledge aggregator computer is further configured to add the instances of the co-occurrence of the two or more features to the feature co-occurrence database along with metadata pertaining to the instance.

10. The system of claim 9 wherein the metadata is selected from the group consisting of feature type, document identifier, document corpus identifier, distance in text between co-occurring features, and a confidence score.

11. The system of claim 9 where in the metadata includes a confidence score indicative whether the two or more of the plurality of features associated with a respective instance of co-occurrence are unique.

12. The system of claim 11 wherein the knowledge base aggregator computer is further configured to calculate the confidence score using a plurality of parameters including a number of co-occurrences in a single electronic document, a number of co-occurrences in the corpus of electronic documents, a size of the corpus of electronic documents, a number of co-occurrences in different corpora of electronic documents, distance in text from co-occurring features, and an indicator of human verification.

13. A non-transitory computer readable medium having stored thereon computer executable instructions comprising:
crawling, via an entity extraction computer, a corpus of a plurality of electronic documents;
extracting, via the entity extraction computer, a plurality of features from each of the crawled electronic documents in the corpus;
aggregating, via a base aggregator computer, instances of co-occurrence of two or more of the plurality of features across the crawled documents to determine a count of the instances of co-occurrence across the plurality of electronic documents,
wherein the count of the instances of co-occurrence of two or more features are determined by adding up number of co-occurrences of the two or more features co-occurred in each of the plurality of electronic documents,
wherein the base aggregator computer includes a main memory hosting a feature co-occurrence in-memory database, wherein the entity extraction computer is distinct from the knowledge base aggregator computer, wherein the feature co-occurrence in-memory database comprises one or more entries of the plurality of features, wherein each entry of the one or more entries contains semantically related features of the plurality of features, and wherein the co-occurrence is an instance of a feature of the plurality of features identified by an entry of the one or more entries in the corpus of the electronic documents in the co-occurrence database, and wherein the co-occurrence corresponds to determination of related entities upon the occurrence of the two or more of the plurality of features that are related to each other across the crawled electronic documents in no defined order; and
adding, via the base aggregator computer, the instance of the co-occurrence of the two or more features to the feature co-occurrence database based on the count of the instances of co-occurrence across the plurality of electronic documents exceeding a predetermined threshold.

14. The computer readable medium of claim 13 wherein each of the plurality of features is selected from the group consisting of a person, a location, an organization name, a topic, an event, and a fact.

15. The computer readable medium of claim 13 wherein the instructions further comprise adding, via the entity extraction computer, the instances of the co-occurrence of the two or more features to the feature co-occurrence database along with metadata pertaining to the instance.

16. The computer readable medium of claim 15 wherein the metadata is selected from the group consisting of feature type, document identifier, document corpus identifier, distance in text between co-occurring features, and a confidence score.

17. The computer readable medium of claim 15 where in the metadata includes a confidence score indicative whether the two or more of the plurality of features associated with a respective instance of co-occurrence are unique.

18. The computer readable medium of claim 17 wherein the instructions further comprise calculating, via the knowledge base aggregator computer, the confidence score using a plurality of parameters including a number of co-occurrences in a single electronic document, a number of co-occurrences in the corpus of electronic documents, a size of the corpus of electronic documents, a number of co-occurrences in different corpora of electronic documents, distance in text from co-occurring features, and an indicator of human verification.

\* \* \* \* \*